US008741052B2

(12) United States Patent
Naidoo et al.

(10) Patent No.: US 8,741,052 B2
(45) Date of Patent: *Jun. 3, 2014

(54) ADHESION AND COHESION MODIFIERS FOR ASPHALT

(71) Applicant: Akzo Novel N.V., Arnham (NL)

(72) Inventors: Premnathan Naidoo, Diamondhead, MS (US); Sundaram Logaraj, Aurora, IL (US); Alan Duncan James, Chicago, IL (US)

(73) Assignee: Akzo Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,604

(22) Filed: Feb. 18, 2013

(65) Prior Publication Data

US 2013/0186302 A1    Jul. 25, 2013

Related U.S. Application Data

(63) Continuation of application No. 12/670,760, filed as application No. PCT/EP2008/059685 on Jul. 24, 2008, now Pat. No. 8,404,037.

(60) Provisional application No. 60/951,995, filed on Jul. 26, 2007.

(30) Foreign Application Priority Data

Aug. 21, 2007 (EP) .................... 07114675

(51) Int. Cl.
C08L 95/00 (2006.01)
C08L 93/00 (2006.01)
C08L 91/06 (2006.01)

(52) U.S. Cl.
USPC ........ 106/273.1; 106/232; 106/235; 106/268; 106/269; 106/272; 106/284.06; 106/284.4

(58) Field of Classification Search
USPC .............. 106/232, 235, 268, 269, 272, 273.1, 106/284.06, 284.4, 500, 502; 524/64
See application file for complete search history.

(56) References Cited

U.S. PATENT DOCUMENTS

| 1,014,103 A | 1/1912 | Wallbaum |
|---|---|---|
| 1,373,661 A | 4/1921 | Johansen |
| 1,384,805 A | 7/1921 | McSwiney |
| 1,542,626 A | 6/1925 | MacKay |
| 1,640,544 A | 8/1927 | Headley |
| 1,674,523 A | 6/1928 | Sadtler |
| 1,778,760 A | 10/1930 | Hay |
| 1,815,089 A | 7/1931 | Alsdorf |
| 1,834,552 A | 12/1931 | Sadtler et al. |
| 1,842,139 A | 1/1932 | Alsdorf |
| 1,887,518 A | 11/1932 | Sadtler |
| 1,888,295 A | 11/1932 | Smith |
| 1,932,648 A | 10/1933 | Taylor |
| 1,948,881 A | 2/1934 | Kirschbaum |
| 1,988,336 A | 1/1935 | Roediger |
| 1,988,879 A | 1/1935 | Steininger |
| 2,023,068 A | 12/1935 | Flood |
| 2,025,945 A | 12/1935 | Forrest |
| 2,046,902 A | 7/1936 | Kirschbaum |
| 2,087,401 A | 7/1937 | Fair |
| 2,191,295 A | 2/1940 | Dohse |
| 2,243,519 A | 5/1941 | Barth |
| 2,283,192 A | 5/1942 | Ditto |
| 2,317,959 A | 4/1943 | Johnson et al. |
| 2,340,449 A | 2/1944 | Barwell |
| 2,374,732 A | 5/1945 | Colburn |
| 2,427,488 A | 9/1947 | Anderson et al. |
| 2,461,971 A | 2/1949 | Fischer |
| 2,550,481 A | 4/1951 | Jense |
| 2,582,823 A | 1/1952 | Fowkes |
| 2,766,132 A | 10/1956 | Blair et al. |
| 2,861,787 A | 11/1958 | Csanyi |
| 2,888,418 A | 5/1959 | Albanese et al. |
| 2,901,369 A | 8/1959 | Pordes |
| 2,917,395 A | 12/1959 | Csanyi |
| 2,919,204 A | 12/1959 | Dybalski et al. |
| 3,259,513 A | 7/1966 | Dickson et al. |
| 3,284,388 A | 11/1966 | Stierli |
| 3,855,167 A | 12/1974 | Bowman |
| 3,904,428 A | 9/1975 | McConnaughay |
| 4,197,209 A | 4/1980 | Zinke et al. |
| 4,198,177 A | 4/1980 | Brett et al. |

(Continued)

FOREIGN PATENT DOCUMENTS

| AU | 433003 | 8/1970 |
|---|---|---|
| AU | 2006231250 | 10/2006 |

(Continued)

OTHER PUBLICATIONS

AKZO International Highway Chemical Newsletter, Chemical Division, Spring 1989, pp. 1-9.
Anderson, David A. et al, "The Effect of Antistrip Additives on the Properties of Asphalt Cement," Asphalt Paving Technology vol. 51, Feb. 22-24, 1982, pp. 298-317.
Barreto, "Warm Asphalt Mixes Containing Dispersed Water," ARKEM-CECA France, Abstract No. 658, 2006, 7 pgs.
Bonola et al., "Technologies for the Production of Asphalt Mixes with Low Temperature Processes," World Road Association Italian National Committee Dec. 2005, 31 pgs.
Butz, Thorsten et al., "Modification of Road Bitumens with the Fischer-Tropsch Paraffin Sasobit" Journal of Applied Asphalt Binder Technology, vol. 1, Issue 2. Oct. 2001 p. 70-86.
Caillot et al., "Warm Mix Asphalts and Cold Recycling for Controlled Use of Effective Road Techniques Reducing Nuisances," Tech. Dept. for Transport . . . France, 12 pgs. undated.
Ceca Arkema Group, "Green Road Formulation-Warm Asphalt Mix. 2007 Innovation: helping to lower our planet's temperature," www.siliporite.com, accessed Nov. 21, 2007, 1 pg.

(Continued)

Primary Examiner — Helene Klemanski
(74) Attorney, Agent, or Firm — Sugiarto Hadikusumo

(57) ABSTRACT

The present invention relates to a bitumen or asphalt formulation for the pavement of road surfaces, said formulation comprising a mixture of bitumen and aggregates, and an additive package evenly distributed therein, said additive package comprising from about i) 10 to 60% by weight of an amine or modified amine surfactant, ii) from about 20 to 90% of an asphalt rheology modifying component.

34 Claims, No Drawings

(56) References Cited

U.S. PATENT DOCUMENTS

| | | | |
|---|---|---|---|
| 4,234,346 | A | 11/1980 | Latta, Jr. et al. |
| 4,244,747 | A | 1/1981 | Leonard, Jr. et al. |
| 4,348,237 | A | 9/1982 | Ruckel |
| 4,592,507 | A | 6/1986 | Benedict |
| 4,692,350 | A | 9/1987 | Clarke et al. |
| 4,724,003 | A | 2/1988 | Treybig et al. |
| 4,747,880 | A | 5/1988 | Berrido et al. |
| 4,836,857 | A | 6/1989 | Hopkins |
| 5,109,041 | A | 4/1992 | Matsuno et al. |
| 5,539,029 | A | 7/1996 | Burris |
| 5,622,554 | A | 4/1997 | Krogh et al. |
| 5,721,296 | A | 2/1998 | Mizunuma et al. |
| 5,743,950 | A | 4/1998 | Hendriks et al. |
| 5,772,749 | A | 6/1998 | Schilling et al. |
| 5,788,755 | A | 8/1998 | Salminen |
| 5,827,360 | A | 10/1998 | Salminen |
| 5,925,233 | A | 7/1999 | Miller et al. |
| 6,136,898 | A | 10/2000 | Loza et al. |
| 6,197,837 | B1 | 3/2001 | Hill et al. |
| 6,451,885 | B1 | 9/2002 | Dresin et al. |
| 6,494,944 | B1 * | 12/2002 | Wates et al. ............. 106/277 |
| 6,559,206 | B1 | 5/2003 | Durand et al. |
| 6,576,050 | B1 | 6/2003 | Samanos |
| 6,588,974 | B2 | 7/2003 | Hildebrand et al. |
| 6,793,964 | B2 | 9/2004 | Hoad |
| 6,846,354 | B2 | 1/2005 | Larsen et al. |
| 6,913,416 | B2 | 7/2005 | Hildebrand et al. |
| 7,041,165 | B2 | 5/2006 | Malot |
| 7,114,843 | B2 | 10/2006 | Romier et al. |
| 7,114,875 | B2 | 10/2006 | Romier et al. |
| 7,160,943 | B2 | 1/2007 | Burris et al. |
| 7,297,204 | B2 | 11/2007 | Crews et al. |
| 7,309,390 | B2 | 12/2007 | Falkiewicz |
| 7,732,511 | B2 | 6/2010 | Barreto et al. |
| 7,815,725 | B2 * | 10/2010 | Reinke et al. ............ 106/284.06 |
| 7,968,627 | B2 | 6/2011 | Reinke et al. |
| 7,981,466 | B2 | 7/2011 | Reinke et al. |
| 7,981,952 | B2 | 7/2011 | Reinke et al. |
| 8,034,172 | B2 | 10/2011 | Naidoo et al. |
| 8,404,037 | B2 * | 3/2013 | Naidoo et al. ............ 106/273.1 |
| 2002/0170464 | A1 | 11/2002 | Larsen et al. |
| 2004/0014845 | A1 | 1/2004 | Takamura et al. |
| 2004/0223808 | A1 | 11/2004 | Romier et al. |
| 2004/0244646 | A1 | 12/2004 | Larsen et al. |
| 2005/0018530 | A1 | 1/2005 | Romier et al. |
| 2005/0101701 | A1 | 5/2005 | Stuart, Jr. et al. |
| 2005/0101702 | A1 | 5/2005 | Stuart, Jr. et al. |
| 2005/0284333 | A1 | 12/2005 | Falkiewicz |
| 2006/0041101 | A1 | 2/2006 | Heinrichs et al. |
| 2006/0086288 | A1 | 4/2006 | Bourrel et al. |
| 2006/0169173 | A1 | 8/2006 | Dupuis et al. |
| 2006/0236614 | A1 | 10/2006 | Antoine et al. |
| 2006/0240185 | A1 | 10/2006 | Antoine et al. |
| 2006/0288907 | A1 | 12/2006 | Fox |
| 2007/0039520 | A1 | 2/2007 | Crews et al. |
| 2007/0060676 | A1 | 3/2007 | Reinke |
| 2007/0082983 | A1 | 4/2007 | Crews et al. |
| 2007/0191514 | A1 | 8/2007 | Reinke et al. |
| 2007/0199476 | A1 | 8/2007 | Bobee et al. |
| 2009/0088499 | A1 | 4/2009 | Barreto et al. |
| 2009/0203815 | A1 | 8/2009 | Barreto et al. |
| 2010/0055304 | A1 | 3/2010 | Reinke et al. |
| 2010/0199885 | A1 | 8/2010 | Naidoo et al. |
| 2010/0227954 | A1 | 9/2010 | Naidoo et al. |
| 2010/0319577 | A1 * | 12/2010 | Naidoo et al. ............. 106/235 |
| 2011/0017096 | A1 | 1/2011 | Reinke |
| 2011/0020537 | A1 | 1/2011 | Reinke |
| 2011/0021673 | A1 | 1/2011 | Reinke |
| 2011/0152410 | A1 | 6/2011 | Reinke |
| 2011/0214589 | A1 | 9/2011 | Reinke |

FOREIGN PATENT DOCUMENTS

| | | | |
|---|---|---|---|
| DE | 10 2007 027 306 A1 | | 12/2008 |
| EP | 0568021 A2 | | 11/1993 |
| EP | 1 247 891 A2 | | 10/2002 |
| EP | 1398351 | | 3/2004 |
| EP | 1469038 | | 10/2004 |
| GB | 429548 | | 5/1935 |
| GB | 783 015 | | 9/1957 |
| GB | 783015 | | 9/1957 |
| GB | 2234512 | * | 2/1991 |
| GB | 2234512 A | | 2/1991 |
| JP | 02-228363 | | 9/1990 |
| JP | 2002/332606 | | 11/2002 |
| JP | 2006/132131 A | | 5/2006 |
| RU | 2119513 | | 9/1998 |
| RU | 2149848 | | 5/2000 |
| RU | 2186044 | | 7/2002 |
| RU | 2196750 | | 1/2003 |
| SU | 806636 A1 | | 2/1981 |
| SU | 834041 | | 5/1981 |
| WO | WO 95/22661 | | 8/1995 |
| WO | WO 99-57199 | | 11/1999 |
| WO | WO 01/16233 | | 3/2001 |
| WO | WO 01/16233 A1 | | 3/2001 |
| WO | WO 01/62852 | | 8/2001 |
| WO | WO 02/16499 | | 2/2002 |
| WO | WO 02053645 | | 7/2002 |
| WO | WO 02/103116 | | 12/2002 |
| WO | WO 2005/081775 A2 | | 9/2005 |
| WO | WO 2006/106222 | | 10/2006 |
| WO | WO 2007/032915 A2 | | 3/2007 |
| WO | WO 2007/054503 A1 | | 5/2007 |
| WO | WO 2007/112335 A2 | | 10/2007 |
| WO | WO 2008/148974 A2 | | 12/2008 |
| WO | WO 2009/013328 A1 | | 1/2009 |
| WO | WO 2009/033060 A1 | | 3/2009 |
| WO | WO 2009/062925 A1 | | 5/2009 |

OTHER PUBLICATIONS

Cervarich, "Cooling Down the Mix" NAPA Explores New "Warm Mix Asphalt" Technologies Developed in Europe, Hot Mix Asphalt Technology, Mar./Apr. 2003, pp. 13-16.

Choi, Y., Warm Asphalt Review, Austroads Report, Arrb Research, RETT220B, Publication No. AP-T91/07, Nov. 2007.

D'Angelo, John, et al., "Warm-Mix Asphalt: European Practice," International Technology Scanning Program, Feb. 2008 62 pgs.

Damm, K., et al. "Asphalt Flow Improvers as Intelligent Fillers for Hot Asphalts—A New Chapter in Asphalt Technology," J. App. Asphalt Binder, vol. 2, Iss. 1, p. 36-70, Apr. 2002.

Declaration of Patrick Lavin, Jun. 6, 2011.

Diefenderfer et al., "Research Report: Installation of Warm Mix Asphalt Projects in Virginia," Virginia Transportation Research Council, Apr. 2007, 34 pgs.

Florida Department of Transporation, Standard Specifications for Road and Bridge Construction, 2007, pp. 244-252 and 772-784.

Gaudefroy, et al., "Laboratory Investigations on the Mechanical Performances of Foamed Bitumen Mixes Using Half-Warm Aggregates," TRB 2007 Ann. Mtg. CD-ROM, Aug. 1, 2006 20 pgs.

Giannattasio, Allessandro, "To Improve the quality of road bitumen," Reprint from the Italian Building and Construction Issue No. 69/1998—19th Year; pp. 2,3,7.

Gibson, Nelson, Modified Asphalt Research Activities at FHWA's Turner-Fairbank Highway Research Center, Pavement Materials snd Construction Team, AMAP Conf., Feb. 2005 18pgs.

Goh et al, Laboratory Evaluation and Pavement Design for Warm Mix Asphalt Proceedings of the 2007 Mid-Continent Transportation Research Symposium, Ames, IA, Aug. 2007, 11pgs.

Gudimettla, Jagan M., et al, "Workability of Hot Mix Asphalt," National Center for Asphalt Technology, Apr. 2003, 66 pgs.

Hurley et al.,"Evaluation of Aspha-Min Zeolite for Use in Warm Mix Asphalt," National Center for Asphalt Technology Report, Auburn University, 30 pgs., Jun. 2005.

Hurley et al., "Evaluation of Evotherm for Use in Warm Mix Asphalt," National Center for Asphalt Technology Report, Auburn University, Jun. 2006, 49 pgs.

(56) References Cited

OTHER PUBLICATIONS

Hurley et at., "Evaluation of Potential Processes for Use in Warm Mix Asphalt," National Center for Asphalt Technology, 2006, 46 pgs.

Hurley, Graham C., et al, "Evaluation of Sasobit for Use in Warm Mix Asphalt," National Center for Asphalt Technology Report, Auburn University, Jun. 2005, 32 pgs.

International Search Report issued in PCT/US/2006/33907, mailed Sep. 24, 2007, 4 pgs.

International Search Report issued in PCT/US2009/052830, mailed Sep. 16, 2010, 2 pages.

International Search Report—issued in PCT/US2008/075452, mailed Feb. 13, 2009; 3 pages.

International Search Report for PCT/US2009/034742, mailed May 26, 2009 4 pages.

Iterchimica Company; "Abstract of the 2005 production categories and applications," Iterchimica Brochure, p. 2 (2005).

James, A.D., et al., "Adhesion Agents for Use in Hot Mixes and Cut-Back Bituments," presented at the 3rd IRF Middle East Regional Meeting, Riyadh, Saudi Arabia, 1988, 10 pgs.

Jenkins et al, "Half-Warm Foamed Bitumen Treatment, A New Process," 7th Conference on Asphalt Pavements for Southern Africa, 1999,7 pgs.

Jones, "Warm Mix Asphalt Pavements: Technology of the Future?" Asphalt, Fall 2004, pp. 8-11.

Kanitpong, Kunnawee, et al., "Laboratory Study on Warm Mix Asphalt Additives," Paper No. 07-1364. TRB 2007 Annual Meeting CD-ROM, 20 pgs.

Koenders et al., "Innovative proeess in asphalt production and application to obtain lower operating temperatures," 2nd Eurasphalt & Eurobitume Con. 2000, Book II pp. 830-840.

Kristjansdottir, Olof. "Warm Mix Asphalt for Cold Weather Paving," a thesis, University of Washington, 2006, 127pgs.

Kristjansdottir, Olof, et al., "Assessing the Potential for Warm Mix Asphalt Technology Adoption," TRB 2007 Annual Meeting CD-ROM,19 pgs.

LaPointe, Dennis G., e-mail correspondence, May 2011,4 pgs.

Lavin, Patrick, "Asphalt Pavements: A practical guide to design, production and maintenance for engineers and architects," 2003, pp. 347.

Logaraj, Sundaram, et at, "Surface-active bitumen additive for warm mix asphalt with adhesion promoting properties," 2009, 12 pgs.

International Search Report dated Dec. 2, 2008 of related PCT application No. PCT/EP2008/059685.

"Low Energy Asphalt (LEA) with the Performance of Hot-Mix Asphalt (HMA)", European Roads Review. Special Issue, BGRA, Feb. 2004 (pp. 1-11).

Malick, R.BN, Bradley, J.E., Bradbury, R.L., An Evaluation of Heated Reclaimed Asphalt Pavement (RAP) Material and Wax Modified Asphalt for Use in Recycled Hot . . . (HMA).' 2007.

Modern Asphalts, "A safer future through designing for maintenance," Autumn 2006, Issue No. 18, 4 pgs.

Naidoo, P., "Fischer-Tropsch Hard Wax Chemistry in Warm Mix Asphalt Applications," Petersen Asphalt Research Conference, Abstract and Presentation Slides, Jun. 20-22, 2005.

Naidoo, P., "Sasohit in Warm Mix Asphalt Applications 9 Years of Global Successes," World Asphalt Conference Presentation Slides, Mar. 14, 2006.

Paez, R., "Production of Modifier Asphalt Additives in Equator," 2005 International Symposium on Pavement Recycling, Sau Paulo, Brazil, Mar. 14-16, 2005, pp. 1-11.

Petersen, J. Claine, "Relationships Between Asphalt Chemical Composition and Performance-Related Properties," ISSA Meeting, Phoenix Arizona, Jan. 23-27,1982. 10th page.

Progress Report 2006, The German Bitumen Forum, Jun. 2006, 36 pgs.

Prowell, Brian D., et al., "Field Performance of Warrn Mix Asphalt at the NCAT Test Track," Paper No. 07-2514, TRB 2007 Annual Meeting CD-ROM, 15 pgs.

Sasobit Product Information 124, The Bitumen Additive for Highly Stable Easily Compactible Asphalts, 9 pgs.

Sasobit Product Information, Roads and Trials with SASOBIT, Oct. 2005, 7.pgs.

Schwartz, Anthony M., et al., Surface Active Agents and Detergents, vol. 2, 1977, pp. 673-677.

Tarrer, A.R., et al., "The Effect of the Physical and Chemical Characteristics of the Aggregate on Bonding," Strategic Highway Research Program, Feb. 1991,31 pgs.

Transportation Research Board of the National Academies, 86th Annual Meeting agenda Jan. 21-25, 2007. 37pgs.

Wasiuddin, Nazimuddin M. et al., "A Comparative Laboratory Study of Sasobit and Aspha-Min in Warm Mix Asphalt," TRB 2007 Annual Meeting CD-ROM. submitted Aug. 1, 2006, pp. 1-12.

European Search Report dated Sep. 25, 2008 for related Application No. 07122340.8-2115.

International Search Report dated Mar. 18, 2009 for related Application No. PCT/EP2008/065278.

Akzo Nobel Technical Bulletin, Adhesion Promoters, 1999.

Amdor 9 bulletin (in Russian).

Translation of Amdor 9 bulletin and application.

Boldyrev et al., presentation at a seminar at MADI, a technical university in Moscow, Apr. 19-22, 2005.

Translation of Boldyrev et al., presentation at a seminar at MADI, Apr. 19-22, 2005.

Chiman et al., "Aspectos de Influencia de Aditivos no Polimetricos Sobre Caracteristicas, de Asfaltos," a paper presented at CILA conference, 2005.

Translation of Chiman et al., "Aspectos de Influencia de Aditivos no Polimetricos Sobre Caracteristicas de Asfaltos," a paper presented at CILA conference, 2005.

Declaration of Jan Alboszta with attachments.

Declaration of Gerald H. Reinke.

DIN 1995, Requirements for the binders, 1989.

Excerpt from Akzo Chemie brochure entitled "Armour Hess Products: Cationic Road Technology," 1970.

Russian State Standard GOST 9128-97 "Asphaltic concrete mixtures for roads and aerodromes and asphaltic concrete", developed in 1998, brought into effect Jan. 1, 1999.

Kosmin et al., "Compressibility of Activated Mineral Powders," 1991.

Redikote E-6 product bulletin, 2003.

Redikote E-6 MSDS, 2003.

American Association of State Highway and Transportation Officials, "Standard Method of Test for Preparing and Determining the Density of Hot-Mix Asphalt . . . ," 2005.

American Association of State Highway and Transportation Officials, "Standard Method of Test for Viscosity Determination of Asphalt Binder Using Rotational Viscometer," 2005.

Wasiuddin et al., "Effect of Antistrip Additives on Surface Free Energy Characteristics of Asphalt Binders for Moisture-Induced Damage Potential," Apr. 18, 2006, Abstract.

Shenoy, "Effect of Using Dispersants During the Mixing of Aggregates with Polymer-Mpdified Asphalts," J. of Dispersion Sci. and Tech., 21(5), 589-604 (2000).

English Machine Translation of DE 10 2007 027 306 A1.

* cited by examiner

US 8,741,052 B2

ADHESION AND COHESION MODIFIERS FOR ASPHALT

CROSS-REFERENCES TO RELATED APPLICATIONS

This application is a continuation of U.S. patent application Ser. No. 12/670,760, filed Jan. 26, 2010, now U.S. Pat. No. 8,404,037, which is a National Stage entry of International Application PCT/EP2008/059685, filed Jul. 24, 2008, which claims the benefit of European Patent Application No. 07114675.7, filed Aug. 21, 2007 and U.S. Patent Application No. 60/951,995, filed Jul. 26, 2007. The contents of the aforementioned applications are incorporated herein by reference in their entireties.

FIELD OF THE INVENTION

The present invention generally relates to a novel combination of surfactants and asphalt rheology modifiers that influence the adhesion and cohesion properties of asphalt to significantly improve the moisture resistance properties of hot-mixes containing difficult aggregates.

BACKGROUND OF THE INVENTION

Asphalt mixes are widely used in road construction and maintenance and majority of asphalt mixes that are used currently are produced by the hot method which is generally known as hot-mix or HMA. This is also known as asphalt concrete which consists of asphalt binder and mineral aggregates. The aggregates could be natural aggregates or processed. Normally processed aggregates are used which have been quarried, crushed, separated into distinct size fractions, washed or otherwise processed to achieve certain performance characteristics of the finished HMA. The aggregates are usually a mixture of various sizes to give desired properties to the asphalt mix as specified in the mix design.

The strength and durability of the asphalt pavements depends on various factors such as the properties of the materials used, the interaction of various materials, the mix-design and construction practices. It is important to attain proper coating of the aggregate with asphalt with optimum binder (asphalt) film thickness and good adhesion of asphalt onto the aggregate, and good cohesive strength of the asphalt to produce a mix that will have good performance during the lifetime of the pavement. The pavements are designed to avoid the various distress types such as permanent deformation, fatigue cracking, low temperature cracking and moisture damage.

Moisture damage is also of great concern. Moisture damage in asphalt mixes can occur by two major pathways. First water will displace asphalt from the aggregate surface especially the ones containing higher amounts of silica since water has a higher affinity for the aggregate surface compared to asphalt and there is lack of chemical bonding of asphalt to the surface. This is known as stripping. Adhesion is the formation of chemical bond between asphalt and the aggregate. Secondly water over a period of time under repeated load can get inside asphalt and reduce the cohesive strength of asphalt. The results of stripping and loss of cohesive strength of the asphalt on the properties of the mix can be conveniently evaluated by the Hamburg wheel tracking test which measures deformation of the mix by a repeated load under water.

It is well known that adhesion promoters which are surface active molecules known as liquid anti-stripping additives or hydrated lime are being used in hot-mix to provide protection against water damage. This solved the problems of water damage with many conventional mixes, but some mixes are unresponsive to conventional anti-stripping additive treatments. It is also well known that the rheology of asphalt can be modified with additives of various types, but these rheology modifying treatments when used alone are not able to solve all problems of water damage.

The invention is concerned with the technical problem of providing an improved bitumen or asphalt, in particular for the production of road surfaces. More specifically, the present inventors have found that a novel combination of surfactants and asphalt rheology modifiers can influence the adhesion and cohesion properties of asphalt to significantly improve the resistance of hot-mixes to moisture damage. This results in superior asphalt or a mixture of bitumen (asphalt) with aggregates which is more resistant to water damage. This is the first instance that a unique combination of surfactants and rheology modifiers have been used as a single package, which demonstrate much improved performance compared to conventional anti-stripping additive treatment.

SUMMARY OF THE INVENTION

The present invention relates to an additive package for asphalt formulations that comprises a novel combination of a surfactant component and a rheology modifier component. Modifiers which modify the rheology (viscosity) of the asphalt, in particular increase the viscosity or "cohesive strength" of asphalt at the temperature of the road. When added to asphalt, the additive package of the invention improves the affinity and chemical bonding of the asphalt to the aggregate surface by increasing the aggregate-asphalt bond's resistance to water, as well as improving the cohesive strength of the asphalt.

DETAILED DESCRIPTION OF THE INVENTION

The present invention relates to a bitumen or asphalt formulation for the pavement of road surfaces, said formulation comprising a mixture of bitumen and aggregates, and an additive package distributed therein.

The additive package of the invention comprises a combination of surface active components and rheology modifying components. The surfactant component preferably comprises at least one an amine or modified amine surfactant, while the rheology modifying component comprises at least one of i) a wax component, ii) a non-asphalt soluble, non-meltable component, and iii) a resin component.

The additive package of the invention positively influences both the adhesion and cohesion properties of asphalt, thereby significantly improving the moisture resistance properties of hot-mixes. The use of the combination of rheology modifiers and surfactant did not lead to problems with compaction of the mixes-compaction was readily achieved in the lab to reach the specified design densities. Any asphalt mixture known to the skilled artisan can be employed in the context of the present invention. For example, standard asphalt wearing course typically contains about 3 to 8% of bitumen, and so-called stone mastic asphalt, which contains about 6.5 to 8.5% of bitumen, can both be readily employed. Since the effect claimed is improvement of binder adhesion and cohesion to minimize moisture damage, the concept is applicable to any paving grade asphalts such as the various grades of PG (Performance Graded) asphalts. This concept can also be extended to roofing applications where improvement in adhesion with mineral fillers and surface aggregates as well as improvement in cohesion of asphalt to extend the lifetime of the application.

As previously discussed, the additive package of the invention comprises from about 10 to 60% by weight of an amine or modified amine surfactant, and from about 20 to 90% of a rheology modifying component or components. The surfactant component preferably comprises at least one amine or modified amine surfactant, while the rheology modifying component comprises at least one of i) a wax component, ii) a non-asphalt soluble, non-meltable component, and iii) a resin component. With certain difficult asphalt mixes, mixtures of two or more rheology modifying components, which may fall into any of the groups i)-iii), can be employed. In another embodiment, the additive package of the invention comprises 20 to 40% by weight of an amine or modified amine surfactant, and from about 30 to 80% of a rheology modifying component. If the rheology modifying component comprises two rheology modifiers from separate classes i) and iii) in accordance with the invention, it is preferred that they are present in a ratio of from 30:70 to 70:30; more preferably 40:60 to 60:40, and in another embodiment, in approximately 50:50 proportions.

A more detailed description of each of the additive package and each of the component materials and properties thereof follows.

The Surfactant Component

The surfactant component of the additive package of the invention comprises at least one amine and/or modified amine surfactant or mixtures thereof. In one example, the surfactant component is selected from amines, diamines, polyamines, ethoxylated amines, ethoxylated alkyl diamines, ethoxylated alkyl polyamines, amido amines, amidopolyamines, imidazolines, and/or any of their corresponding organic and/or inorganic salts, and mixtures and combinations of same. Some examples of the amine and/or modified amine surfactants employable in the context of the invention are generally depicted by the following general formulae:

I. Amines

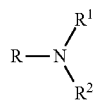

wherein R is a saturated or unsaturated, substituted or unsubstituted, optionally branched or cyclic, hydrocarbon radical with 8-24 carbon atoms, for example derived from tallow fatty acids, or tall oil fatty acids. $R^1$ and $R^2$ can be the same or different and are selected from hydrogen or hydrocarbon radical with 1-24 carbon atoms. $R^1$ and $R^2$ are preferably selected from hydrogen or methyl. A representative example is hydrogenated tallowamine (CAS No. 61788-45-2)

II. Diamines and Polyamines

where R has the same meaning as in I., above, and $R^3$ represents a linear or branched hydrocarbon radical with 1-6 carbon atoms. In one embodiment $R^3$ is propylene radical (—$CH_2CH_2CH_2$—) and x is a small integer of less than or equal to 6. A representative example, where R=tallow, x=1 and $R^3$=propylene, is N-tallow propylenediamine (CAS No. 61791-55-7)

III. Ethoxylated or Propoxylated Amines

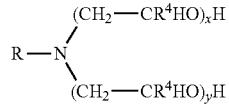

where R has the same meaning as in I., above; $R^4$ is methyl or hydrogen; and x and y are independently selected from 0, 1 or 2. In one embodiment, x=y=1. A representative example, where R=hydrogenated tallow alkyl, x=y=1 and $R^4$ is H, is N,N diethanol, hydrogenated tallowamine (CAS No. 90367-28-5).

IV. Ethoxylated or Propoxylated alkyl Diamines and ethoxylated alkyl polyamines e.g.

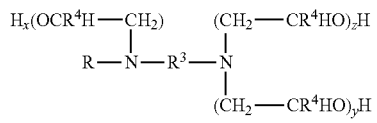

wherein R, $R^3$ and $R^4$ have the same meaning as in I, II. and III, above; x, y, and z are independently selected from 0, 1 or 2 and x+y+z< or =5. In one embodiment, x=y=z=1. A representative example, where R=hydrogenated tallowalkyl, x=y=z=1, and R<3>=propylene and R<4> is H, is N,N, N Tris(2-hydroxyethyl)-N-hydrogenated tallow-1,3-diaminopropane (CAS No. 90367-25-2). The ethoxylated or propoxylated alkyl diamines and ethoxylated alkyl polyamines may also have the following formula

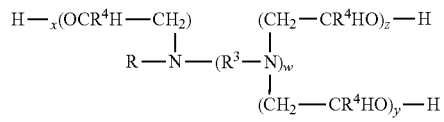

wherein R, $R^3$ and $R^4$ have the same meaning as above; w=1-3; x, y, and z are independently selected from 0, 1 or 2 and x+y+z<w+4.

V. Alkyl Amido amines

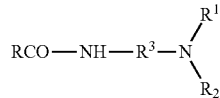

wherein R, $R^1$, $R^2$ and $R^3$ have the same meaning as in I-III., above. A representative example where $R^1$=$R^2$=methyl and $R^3$=propylene and R=$C_8$-$C_{22}$ alkyl has the CAS No. 84082-43-9.

VI. Amidopolyamines and imidazolines e.g.

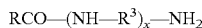

wherein R and $R^3$ have the same meaning as in example I., above, and x=an integer of from 1 to 10. This group includes the reaction product of fatty acids or esters with complex mixtures of polyethylenepolyamines and related compounds which may contain also cyclic and substituted nitrogens obtained as by-products in the manufacture of diethylene triamine and ethylene diamine. Representative compounds have the CAS Nos 402591-95-1, 68910-93-0, 103213-06-3, 95-38-5.

The products listed above may be present in the mixtures described in the invention as their salts or organic or inorganic acids including but not limited to the salts of long chain fatty acids, e.g. stearic acid, salts of phosphoric acids, or substituted phosphoric acids, acetic acid, naphthenic acids, rosin acids etc.

Specific surfactants useful in the additive package of the invention include, but are not limited to ethoxylated tallow amines, fatty amines, fatty amine derivatives, tall oil amidoamines/imidazolines, bis hexamethylene triamine and higher oligomers of hexmethylediamine, other alkyl amine surfactants with a hydrocarbon chain consisting of 8 to 22 carbon atoms and mixtures combinations thereof. Specific examples of such surfactants include, but are not limited to tallow n-propylene diamine, tris-ethoxylated tallow N-propylene diamine, Redicote C-450, a mixture of imidazolines and amidopolyethylenepolyamines, Wetfix 312—a mixture of imidazolines and amidoamines available from Akzo Nobel Surface Chemistry LLC, Chicago, Ill. The surfactant component can also include hydrogenated tallow propylene diamine, ethoxylated hydrogenated tallow propylene diamine, tallow dipropylene triamine, tallow tripropylene tetramine and their derivatives, and amides resulting from the condensation of fatty acids with dimethylaminopropylamine.

Rheology Modifying Component

The rheology modifying component of the additive package of the invention comprises i) at least one wax component, ii) optionally a non-asphalt soluble, non-meltable component, iii) at least one resin component and mixtures and combinations thereof.

i) Wax Component

Wax modifiers that can be usefully employed in the context of the invention include, but are not limited to waxes of vegetable (e.g. carnuba wax), animal (e.g beeswax) mineral (e.g. Montan™ wax from coal, Fischer Tropsch wax from coal) or petroleum (e.g. paraffin wax, polyethylene wax, Fischer-Tropsch wax from gas) origin including oxidised waxes; amide waxes (e.g. ethylene bis stearamide, stearyl amide, stearylstearamide); fatty acids and soaps of waxy nature (e.g aluminum stearate, calcium stearate, fatty acids); other fatty materials of waxy nature (fatty alcohols, hydrogenated fats, fatty esters etc) with the ability to stiffen asphalt, and the like. The above products are basically soluble in the asphalt at the temperatures of the hot mix, to make a homogeneous binder, and/or will melt at the temperature of the mix and the ingredients will disperse/dissolve into the mixture. The wax and resin ingredients will generally act to improve cohesion properties of the asphalt, while the adhesion promoter will improve the adhesion of the asphalt to the aggregate. Together the ingredients provide improved resistance to water damage.

In one embodiment, the invention preferably employs a Fischer Tropsch Wax derived from coal or natural gas or any petroleum feedstock. The process entails the gasification of the above feedstock by partial oxidation to produce carbon monoxide under high temperature and pressure and reaction of the resultant carbon monoxide with hydrogen under high temperature and pressure in the presence of a suitable catalyst (such as iron compound or cobalt compound) for example as in the case of the processes currently employed by Shell and Sasol. The congealing point of the wax is between 68° C. and 120° C. with a Brookfield viscosity at 135° C. in the range of 8 to 20 cPs; in one embodiment, the congealing point of the wax is between 80° C. and 120° C.; and in another embodiment, the congealing point of the wax is between 68° C. and 105° C.

ii) Non-Asphalt Soluble, Non-Meltable Component

A second type of rheology modifier employable as the rheology modifying component of the invention are the so-called non-asphalt soluble, non-meltable modifiers. Such additives, which are also employed to increase the viscosity of the asphalt, never melt but can be dispersed into the asphalt phase where they increase the viscosity. Examples include, but are not limited to carbon black, certain clays, possibly organically modified, silica e.g fumed silica, lime, cellulose fiber and other fibers insoluble in asphalt, and the like.

iii) Resin Component

A third type of rheology modifying component comprises resins of vegetable (tall oil pitch, pine tar pitch, tall oil rosins, rosin acids, pine rosins, gum rosins including chemically modified resins like maleated and fumarated rosins and resinous by-products from tall oil processing or the processing of gum rosins.) or petroleum (petroleum resins, phenolic resins). In particular resins having a Drop melt point>60° F. and a Penetration <50 at 25° C., for example Tall Oil pitch or modified tall oil pitches containing long chain and tricyclic organic acids and sterols, are useful. The tall oil resin based modifiers may also include non-resinous fractions from distillation of crude tall oil such as fatty acids, tall oil heads, and may also include chemically modified version of these fractions as a result of maleation and fumarization. Preferred rheology modifiers of this class include, but are not limited to tall oil pitch, maleated tall oil pitch, rosin acids, tall oil heads. Polymers of plastomer (polyethylene, polypropylene, ethylvinylacetate) or elastomer (natural rubber, styrene butadiene rubber, polychlorprene, crumb rubber from reclaimed tires etc) character; asphaltic materials of high softening point (e.g. asphaltenes, Gilsonite™, Trimidad Lake Asphalt, by-products from the deasphalting of oils, oxidised asphalts etc); asphaltenes such as ROSE bottoms (Residuum Oil Super-critical Extraction) and other zero penetration asphalts may also be employed either alone or in combination.

In broader terms the invention contemplates a combination of surface active agents with one or more asphalt rheology modifiers which might include Fischer Tropsch wax, other types of wax, polymers, carbon black, Gilsonite, or tall oil based modifiers, the key feature being that these types of ingredients have been combined into a single product.

The additive package of the invention can be blended into the asphalt before the asphalt is introduced to the aggregate in the hot-mix plant, it can be added to the aggregate, or a portion of the aggregate, before asphalt is added to the mixer or it can be added to the mixer in the hot-mix plant after asphalt has been added to the aggregate. It is preferably added into the mixer such as the drum mixer at the hot-mix plant. The dosage level of the additive package by the weight of the asphalt is in a range from 0.2 to 10% by weight, preferably in the range from 0.5 to 10% by weight, more preferably in the range from 0.5 to 6% by weight, and further preferably about 1 to 3% by weight, based on asphalt.

The additive package of the invention has the following advantages over current technologies:

(a) It improves the moisture resistance of mixes when subjected to a repeated load in wet conditions as demonstrated by the Hamburg Wheel Tracking Test, compared to conventional treatments such as use of liquid anti-stripping additives or the use of hydrated lime.

(b) It has advantage over hydrated lime treatment for normal mixes in terms of cost and ease of use. The use level is less than 3 lbs per ton of mix compared to a typical lime treatment of about 20 to 30 lbs per ton of mix. It also lowers freight cost as less material needs to be transported compared to lime. The additive as will be described shortly can be produced in a form which is easy to use without dust problems.

(c) It increases the durability of the mix without compromising the properties of the flexible pavement.

(d) The additive package of the invention, because of melting point and physical characteristics allows it to be formulated in a physical form such as powder, pastillated, or flaked free flowing solid or in molten (hot liquid form) which can be blended into asphalt just before production of the hot-mix or could be added to the drum dryer at various stages during the production of the hot-mix, as described above.

The invention will now be illustrated by the following non-limiting examples. All tests were performed in accordance with the Tex-242-F, Hamburg Wheel Tracking test procedure issued by the Texas Department of Transportation.

Dallas APAC R&D Hamburg Test Results
Mix Composition: Ty D
    48% Martin Marietta Chico Type D Limestone Aggregate
    22% Martin Marietta Chico Limestone Screenings
    10% Hanson Sand, Ferris, Tex.
    5.6% Valero PG 64-22

| Material ID | Mix Type | Additive % | Test Temp, C.° | Cycles To Failure | Deform, mm | Notes | Test Date |
|---|---|---|---|---|---|---|---|
| Control | D | 2.0 | 50 | 3,700 | 12.5 | Stripped | 15-Sep-06 |
| AKZO 4/09/06 | D | 2.0 | 50 | 11,700 | 12.5 | No evidence of stripping | 11-Oct-06 |

TxDOT Hamburg Requirements:

| PG 64 | 10,000 cycles @ 12.5 mm of maximum deformation |
|---|---|
| PG 70 | 15,000 cycles @ 12.5 mm of maximum deformation |
| PG 76 | 20,000 cycles @ 12.5 mm of maximum deformation |

Beaumont APAC R&D Hamburg Test Results
Mix Composition: Ty D
    46% Tower No 8 Limestone Aggregate
    24% MM Cave-in-Rock No 11 Limestone Aggregate
    15% MM Cave-in-Rock Mfg Sand Limestone Aggregate
    13% Kerr Materials Natural Sand Siliceous Aggregate
    4.5% PG 64-22 Total Port Arthur

| Material ID | Mix Type | Additive % | Test Temp, C.° | Cycles To Failure | Deform, mm | Notes | Test Date |
|---|---|---|---|---|---|---|---|
| Control | D | 0.0 | 50 | 4,870 | 12.52 | Stripped | 24-Jul-06 |
| Kling Beta 2550HM* | D | 1.0 | 50 | 5,500 | 12.53 | Stripped | 24-Jul-06 |
| Akzo Nobel 4/09/06 | D | 2.0 | 50 | 15,600 | 12.53 | Looked Good | 21-Sep-06 |

*Akzo Nobel conventional liquid antistripping additive

TxDOT Hamburg Requirements:

| PG 64 | 10,000 cycles @ 12.5 mm of maximum deformation |
|---|---|
| PG 70 | 15,000 cycles @ 12.5 mm of maximum deformation |
| PG 76 | 20,000 cycles @ 12.5 mm of maximum deformation |

"Akzo Nobel Apr. 9, 2006" is a mixture illustrating the invention and comprises:
Toprez HM (tall oil derived resin ex Chusei)—33% by weight
N-tallow propylene diamine—25% by weight
Fischer Tropsch wax—42% by weight In the test method compacted samples of asphalt mixtures are subjected to repeated wheel tracking cycles under water. Failure of the sample is shown by deformation (rutting). A deformation of 12.5 mm is taken as a sign of failure. The number of cycles to 12.5 mm deformation is a measure of the performance of the mixture. The tests clearly show that mixtures containing the additive package illustrative of the invention Akzo Nobel Apr. 9, 2006 survived more cycles before reaching the limit of 12.5 mm deformation.

Failure is often the result of stripping (detachment of asphalt from the aggregate) and while the test method does not measure stripping per se, stripping can be seen by the presence of uncoated surfaces of the large aggregates and by loss of aggregate fines and asphalt into the water. The comments noted in the Tables provide qualitative evidence that the treatment with Akzo Apr. 9, 2006 showed low stripping compared to untreated mixtures, or mixture containing conventional liquid antistripping agent.

We claim:

1. An additive package suitable for use with a mixture of asphalt and aggregates, the additive package comprising from about i) 10 to 60% by weight of a surfactant component, and ii) from about 20 to 90% of asphalt rheology modifying components, wherein the additive package improves the moisture resistance properties of the mixture of asphalt and aggregates.

2. The additive package of claim 1 wherein the surfactant component comprises at least one surfactant selected from the group consisting of:

(i) amines of the formula

wherein R is a saturated or unsaturated, substituted or unsubstituted, optionally branched or cyclic, hydrocarbon radical with 8-24 carbon atoms, $R^1$ and $R^2$ can be the same or different and are either hydrogen or hydrocarbon radical with 1-24 carbon atoms;

(ii) diamines and polyamines of the formula

where R has the same meaning as above, and $R^3$ represents a linear or branched hydrocarbon radical with 1-6 carbon atoms;

(iii) Ethoxylated or Propoxylated Amines of the formula

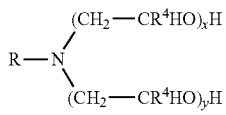

where R has the same meaning as above; $R^4$ is methyl or hydrogen; and x and y are independently 0, 1 or 2;

(iv) Ethoxylated or Propoxylated alkyl Diamines or ethoxylated or propoxylated alkyl polyamines of the formula

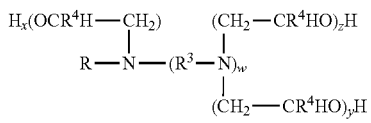

wherein R, $R^3$ and $R^4$ have the same meaning as above; w=1-3; x, y, and z are independently 0, 1 or 2 and x+y+z<w+4;

(v) amido amines of the formula

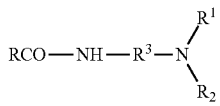

wherein R, $R^1$, $R^2$ and $R^3$ has the same meaning as above;

(vi) amidopolyamines of the formula

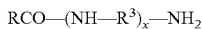

wherein R and $R^3$ have the same meaning as above, and x=an integer of froml to 10;
the organic or inorganic salts of the above classes of surfactants, (vii) amidoamines formed from the condensation of fatty acids or esters with by-products from the manufacture of polyethylene polyamines which may also contain cyclic and substituted amine groups, (viii) imidazolines formed from the dehydration of such amidoamines; and (ix) mixtures and combinations thereof.

3. The additive package of claim 1 wherein said surfactant component comprises at least one amine and/or modified amine surfactant selected from the group consisting of ethoxylated tallow amines, fatty amines, fatty amine derivatives, tall oil amidoamines/imidazolines, bis hexamethylene triamine and higher oligomers, other alkyl amine surfactants with a hydrocarbon chain, saturated or unsaturated, consisting of 8 to 22 carbon atoms and mixtures combinations thereof.

4. The additive package of claim 3 wherein said surfactant is selected from the group consisting of tallow diamine, ethoxylated tallow diamine, imidazoline made from tall oil fatty acids and mixture of ethyleneamines, hydrogenated tallow diamine, ethoxylated hydrogenated tallow propylene diamine, tallow dipropylene triamine, tallow tripropylene tetramine and their derivatives, ethoxylated tallow amines, fatty amines, fatty amine derivatives, tall oil amidoamines/imidazolines and mixtures and combinations thereof.

5. The additive package of claim 1 wherein said asphalt rheology modifying component comprises i) at least one wax component, ii) optionally at least one non-asphalt soluble, non-meltable component, and/or iii) at least one resin component and mixtures and combinations thereof.

6. The additive package of claim 5 wherein said asphalt rheology modifying component comprises i) a wax component, and said wax component is selected from the group consisting of waxes of vegetable, animal, mineral or petroleum origin.

7. The additive package of claim 6 wherein said wax component is selected from the group consisting of carnuba wax, beeswax, montan wax from coal, Fischer Tropsch wax from coal, petroleum or gas origin, amide waxes, fatty acids and soaps; fatty alcohols, hydrogenated fats, fatty esters, and mixtures thereof.

8. The additive package of claim 7 wherein said wax component is selected from the group consisting of paraffin wax, polyethylene wax, ethylene bis stearamide, stearyl amide, stearylstearamide; aluminum stearate, calcium stearate, fatty acids; fatty alcohols, hydrogenated fats, fatty esters and mixtures thereof.

9. The additive package of claim 1 wherein said rheology modifying component comprises a non-asphalt soluble, non-meltable component.

10. The additive package of claim 9 wherein said non-asphalt soluble, non-meltable component comprises carbon black, clay, organically modified clay, silica, fumed silica, lime, cellulose fiber, other fibers insoluble in asphalt, and mixtures and combinations thereof.

11. The additive package of claim 1 wherein said rheology modifying component comprises a resin component, said resin component comprising tall oil pitch, pine tar pitch, tall oil rosins, pine rosins, gum rosins, chemically modified resins, maleated and fumarated rosins, resinous by-products from tall oil processing, chemically modified by-products from tall oil processing, resinous by-products from gum rosin processing, petroleum resins, phenolic resins, polyethylene, polypropylene, ethylvinylacetate, natural rubber, styrene butadiene rubber, polychloroprene, crumb rubber asphaltenes, uintahite, Trimidad Lake Asphalt, by-products from the deasphalting of oils, oxidised asphalts, ROSE bottoms- and mixtures thereof.

12. The additive package of claim 11 wherein said resin component is selected from the group consisting of tall oil pitch, maleated tall oil pitch, rosin acids, tall oil heads and mixtures thereof.

13. The additive package of claim 1 wherein said asphalt rheology modifying component comprises at least two of i) a wax component, ii) a non-asphalt soluble, non-meltable component, and iii) a resin component.

14. The additive package of claim 1 wherein said asphalt rheology modifying component comprises i) at least one a wax component, and iii) at least one resin component.

15. An additive package suitable for use with a mixture of asphalt and aggregates, the additive package comprising from about
i) 10 to 60% by weight of a surfactant component, wherein said surfactant component is selected from the group consisting of N-tallowalkyl propylenediamine, ethoxylated tallow diamine, imidazoline made from tallow, hydrogenated tallow, or tall oil fatty acids and mixture of ethyleneamines, hydrogenated tallow diamine, ethoxylated hydrogenated tallow propylene diamine, tallow dipropylene triamine, tallow tripropylene tetramine and their derivatives, ethoxylated tallow amines, fatty amines, fatty amine derivatives, fatty amidoamines/imidazolines, the salts of any of the above amine derivatives with inorganic or organic acids, and mixtures and combinations thereof and ii) from about 20 to 90% of an asphalt rheology modifying component, wherein said rheology modifying component comprises a) a wax component and b) a resin component, wherein said wax component is a Fischer Tropsch wax and said resin component is selected from the group consisting of tall oil pitch, maleated tall oil pitch, rosin acids, tall oil heads and mixtures thereof;

wherein the additive package improves the moisture resistance properties of the mixture of asphalt and aggregates.

16. The additive package of claim 15 wherein said rheology modifier comprises a Fischer-Tropsch wax having a congealing point from about 68 to about 105° C.

17. The additive package of claim 15 wherein said additive package is in the form of granules, powder, flakes or pellets or in liquid form.

18. A method of improving the moisture resistance properties of hot-mix asphalt containing aggregates, said method comprising adding to said asphalt an effective amount of an additive package comprising from about i) 10 to 60% by weight of a surfactant component, ii) from about 20 to 90% of an rheology modifying component.

19. The method of claim 18 wherein the surfactant component comprises at least one surfactant selected from the group consisting of:
(i) amines of the formula

wherein R is a saturated or unsaturated, substituted or unsubstituted, optionally branched or cyclic, hydrocarbon radical with 8-24 carbon atoms, $R^1$ and $R^2$ can be the same or different and are either hydrogen or hydrocarbon radical with 1-24 carbon atoms;
(ii) diamines and polyamines of the formula

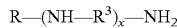

where R has the same meaning as above, and $R^3$ represents a linear or branched hydrocarbon radical with 1-6 carbon atoms;
(iii) Ethoxylated or Propoxylated Amines of the formula

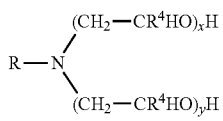

where R has the same meaning as above; $R^4$ is methyl or hydrogen; and x and y are independently 0, 1 or 2;
(iv) Ethoxylated or Propoxylated alkyl Diamines or ethoxylated or propoxylated alkyl polyamines of the formula

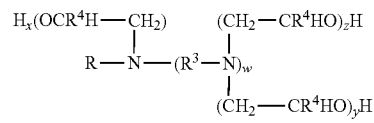

wherein R, $R^3$ and $R^4$ have the same meaning as above; w=1-3; x, y, and z are independently 0, 1 or 2 and x+y+z<w+4;
(v) amido amines of the formula

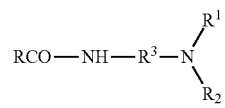

wherein R, $R^1$, $R^2$ and $R^3$ has the same meaning as above;
(vi) amidopolyamines of the formula

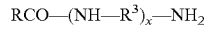

wherein R and $R^3$ have the same meaning as above, and x=an integer of froml to 10;
the organic or inorganic salts of the above classes of surfactants;
(vii) imidazolines formed from the condensation of amidoamines;
(viii) imidazolines formed from the condensation of fatty acids or esters with by-products from the manufacture of polyethylene polyamines which may also contain cyclic and substituted amine groups; and
(ix) mixtures and combinations thereof.

20. The method of claim 19 wherein said surfactant component comprises at least one amine and/or modified amine surfactant selected from the group consisting of ethoxylated tallow amines, fatty amines, fatty amine derivatives, tall oil amidoamines/imidazolines, bis hexamethylene triamine and higher oligomers, other alkyl amine surfactants with a hydrocarbon chain, saturated or unsaturated, consisting of 8 to 22 carbon atoms and mixtures combinations thereof.

21. The method of claim 20 wherein said surfactant is selected from the group consisting of tallow diamine, ethoxylated tallow propylene diamine, imidazoline made from tallow, hydrogenated tallow or tall oil fatty acids and mixture of ethyleneamines, hydrogenated tallow propylene diamine, ethoxylated hydrogenated tallow propylene diamine, tallow dipropylene triamine, tallow tripropylene tetramine and their derivatives, ethoxylated tallow amines, fatty amines, fatty amine derivatives, tall oil amidoamines/imidazolines and mixtures and combinations thereof.

22. The method of claim 19 wherein said asphalt rheology modifying component comprises i) at least one wax component, ii) optionally at least one non-asphalt soluble, non-meltable component, and/or iii) at least one resin component and mixtures and combinations thereof.

23. The method of claim 22 wherein said asphalt rheology modifying component comprises i) a wax component, and said wax component is selected from the group consisting of waxes of vegetable, animal, mineral or petroleum origin.

24. The method of claim 23 wherein said wax component is selected from the group consisting of carnuba wax, beeswax, montan wax from coal, Fischer Tropsch wax from coal, petroleum or gas origin, amide waxes, polymers of plastomer or elastomer character; asphaltic materials of high softening point; asphaltenes, other zero penetration asphalts, fatty acids and soaps; fatty alcohols, hydrogenated fats, fatty esters, and mixtures thereof.

25. The method of claim 24 wherein said wax component is selected from the group consisting of paraffin wax, polyethylene wax, ethylene bis stearamide, stearyl amide, stearylstearamide; aluminum stearate, calcium stearate, fatty acids; fatty alcohols, hydrogenated fats, fatty esters and mixtures thereof.

26. The method of claim 18 wherein said asphalt rheology modifying component comprises at least two of i) a wax component, ii) optionally a non-asphalt soluble, non-meltable component, and iii) a resin component.

27. The method of claim 18 wherein said asphalt rheology modifying component comprises i) a wax component, and iii) a resin component, wherein said wax component is a Fischer Tropsch wax and said resin component is selected from the group consisting of tall oil pitch, maleated tall oil pitch, rosin acids, tall oil heads and mixtures thereof.

28. The method of claim 18 wherein said asphalt and aggregates are mixed in a mixer, and wherein said additive package a) is blended into said asphalt before the aggregates are introduced to the mixer; or b) added to the aggregates, or portion of the aggregates before the asphalt is introduced to the mixer; or c) added to the mixer after the asphalt has been added to the aggregate in said mixer, or combinations of a)-c).

29. The method of claim 18 wherein said rheology modifying component comprises a non-asphalt soluble, non-meltable component.

30. The method of claim 29 wherein said non-asphalt soluble, non-meltable component comprises carbon black, clay, organically modified clay, silica, fumed silica, lime, cellulose fiber, other fibers insoluble in asphalt, and mixtures and combinations thereof.

31. The method of claim 18 wherein said rheology modifying component comprises a resin component, said resin component comprising tall oil pitch, pine tar pitch, tall oil rosins, pine rosins, gum rosins, chemically modified resins, maleated and fumarated rosins, resinous by-products from tall oil processing, chemically modified by-products from tall oil processing, resinous by-products from gum rosin processing, petroleum resins, phenolic resins, polyethylene, polypropylene, ethylvinylacetate, natural rubber, styrene butadiene rubber, polychloroprene, crumb rubber asphaltenes, uintahite, Trimidad Lake Asphalt, by-products from the deasphalting of oils, oxidised asphalts, ROSE bottoms- and mixtures thereof.

32. The method of claim 18 wherein said resin component is selected from the group consisting of tall oil pitch, maleated tall oil pitch, rosin acids, tall oil heads and mixtures thereof.

33. The method of claim 18 wherein said asphalt rheology modifying component comprises at least one a wax component and at least one resin component.

34. The method of claim 18 wherein the additive package is in the form of granules, powder, flakes or pellets or in liquid form.

* * * * *